United States Patent
Jiang

(10) Patent No.: US 9,246,638 B2
(45) Date of Patent: Jan. 26, 2016

(54) METHOD AND APPARATUS FOR POLLING TRANSMISSION STATUS IN A WIRELESS COMMUNICATIONS SYSTEM

(75) Inventor: Sam Shiaw-Shiang Jiang, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1129 days.

(21) Appl. No.: 12/120,648

(22) Filed: May 15, 2008

(65) Prior Publication Data

US 2008/0285583 A1 Nov. 20, 2008

Related U.S. Application Data

(60) Provisional application No. 60/917,940, filed on May 15, 2007.

(51) Int. Cl.
*H04L 12/42* (2006.01)
*H04L 12/403* (2006.01)
*H04L 1/16* (2006.01)
*H04W 74/06* (2009.01)

(52) U.S. Cl.
CPC ............ *H04L 1/1685* (2013.01); *H04W 74/06* (2013.01)

(58) Field of Classification Search
CPC .................................................. H04W 74/06
USPC ........................................................ 370/449
See application file for complete search history.

(56) References Cited

U.S. PATENT DOCUMENTS

| | | | | |
|---|---|---|---|---|
| 6,301,479 B1* | 10/2001 | Roobol et al. | ................ | 455/436 |
| 6,643,813 B1* | 11/2003 | Johansson et al. | ............ | 714/748 |
| 6,868,064 B2* | 3/2005 | Yi et al. | ........................ | 370/236 |
| 2002/0015385 A1 | 2/2002 | Yi et al. | | |
| 2006/0056441 A1* | 3/2006 | Jiang | ............................ | 370/449 |
| 2006/0154603 A1 | 7/2006 | Sachs | | |

FOREIGN PATENT DOCUMENTS

| | | |
|---|---|---|
| JP | 2004179916 A | 6/2004 |
| KR | 20020003726 | 1/2002 |
| KR | 1020040048154 | 6/2004 |
| KR | 1020060090191 | 8/2006 |

OTHER PUBLICATIONS

3GPP TSG RAN WG2 #57bis, Mar. 26-30, 2007, St Julian, Malta, R2-071470, Qualcomm, L2 improvements and polling, entire document.*
QUALCOMM Europe: "L2 improvements and polling", 3GPP TSG-RAN WG2#58, R2-072021, pp. 1-3, May 7-11, 2007, XP002549814.
3GPP: "3GPP TS 25.322 V7.2.0; 3rd Generation Partnership Project; Technical Specification Group Radio Access Network; Radio Link Control (RLC) protocol specification (Release 7)", Sep. 2006, pp. 1, 2, 10-63, XP002492999.
3GPP TS 25.322 V7.1.0 (Jun. 2006), "Radio Link Control (RLC) protocol specificaiton (Release 7)".
R2-072260, "Introduction of Improved L2 support for high data rates", Ericsson, 3GPP RAN2 #57, Feb. 12-16, 2007.
Office Action on corresponding foreign application (TW 097117820) from TIPO dated Dec. 27, 2013.

* cited by examiner

*Primary Examiner* — Maharishi Khirodhar
(74) *Attorney, Agent, or Firm* — Blue Capital Law Firm, P.C.

(57) ABSTRACT

When a polling procedure is triggered, the value of the poll sequence number field within a status protocol data unit is always set to be a sequence number of a next protocol data unit to be transmitted for the first time minus 1, regardless of the configured transmission window size so as to avoid unnecessary transmission delay.

6 Claims, 4 Drawing Sheets

METHOD AND APPARATUS FOR POLLING TRANSMISSION STATUS IN A WIRELESS COMMUNICATIONS SYSTEM

CROSS REFERENCE TO RELATED APPLICATIONS

This application claims the benefit of U.S. Provisional Application No. 60/917,940, filed on May 15, 2007 and entitled "Method and apparatus of polling request in a wireless communications system", the contents of which are incorporated herein by reference.

BACKGROUND OF THE INVENTION

1. Field of the Invention

The present invention relates to a method and apparatus for polling transmission status in a wireless communications system, and more particularly, to a method and apparatus for preventing retransmission of PDUs that have been successfully transmitted, and reducing transmission latency.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates.

The access stratum of the 3G mobile telecommunications system comprises a radio resource control (RRC), radio link control (RLC), media access control (MAC), packet data convergence protocol (PDCP), broadcast/multicast control (BMC) and other sub-layers of different functions. The operations of the above-mentioned sub-layers are well known for those skilled in the art, and will not be further mentioned. In addition, the 3G mobile telecommunications system can provide different levels of transmission quality and operate in different modes according to the different requirements, for instance, Transparent Mode (TM), Unacknowledged Mode (UM), Acknowledged Mode (AM). TM is used for services requiring instant transmission, UM is used for services requiring instant transmission as well as packet orders, and AM is used for robust services requiring data accuracy but not instant transmission.

In AM, for better data accuracy and robustness, RLC layers of a transmitter and a receiver initiate a status report procedure at an appropriate time to have the transmitter poll the receiver so that the receiver transmits a status report, or a piggybacked status report to the transmitter. The transmitter then executes procedures followed according to the status report from the receiver. As the transmitter polls the receiver, the transmitter selects a Protocol Data Unit (PDU) and sets a polling bit of the PDU as ON (=1), which requests the receiver to transmit a status report. In such a situation, if there is no PDU scheduled for transmission or retransmission, the transmitter selects a PDU that has been transmitted, and sets a polling bit of the PDU to be 1 to poll the receiver. In other words, when a poll is triggered while no PDU is scheduled for transmission or retransmission, the transmitter shall select a PDU that has been transmitted to poll the receiver, causing unnecessary retransmission and waste of system resources.

In order to improve the afore-mentioned problem, the prior art provides a method for triggering a poll, where a POLL SUFI (Super Field) scheme is applied. That is, when the transmitter needs to poll the receiver, the transmitter can send a STATUS PDU containing a POLL SUFI to request a status report from the receiver. In the prior art, the POLL SUFI is composed of a Type field and a Poll_SN (Sequence Number) field. The Poll_SN field comprises 12 bits, and is configured by the following rule. When "Poll" is configured and the value of "Configured_Tx_Window_Size" is larger than or equal to "2048", the Poll_SN field shall be set to VT(S)−1, where "Configured_Tx_Window_Size" represents the size of the transmission window, and VT(S) represents SN of the next PDU to be transmitted for the first time. Otherwise, if "Poll" is configured and the value of the "Configured_Tx_Window_Size" is less than "2048", the Poll_SN field can either be set to VT(S)−1 or SN of a PDU that has not been discarded and has not yet been acknowledged by the peer entity. Accordingly, after receiving the STATUS PDU containing POLL SUFI, the receiver considers that a PDU with SN=Poll_SN has been transmitted by the transmitter, and transmits a status report corresponding to its receiving status to the transmitter.

Via POLL SUFI, the prior art can prevent unnecessary retransmission. However, the POLL SUFI method may cause transmission delay and degradation of efficiency. For example, suppose that the "Configured_Tx_Window_Size" is configured to be 1024, and PDUs of SN=0, 1, 2, 3 have been transmitted. In other words, VT(S)=4. Suppose that none of the four transmitted PDUs are positively acknowledged. When a poll is triggered, by the prior art, the transmitter can send a POLL SUFI containing Poll_SN equal to VT(S)−1 or SN of a PDU that has not been discarded and has not yet been acknowledged by the receiver. In other words, the transmitter can set Poll_SN to 0, 1, 2, or 3. If the transmitter sets Poll_SN to 0 while the receiver did not receive any of the four AMD PDUs before receiving the POLL SUFI, the receiver can only consider that the PDU of SN=0 has been transmitted, and send a status report to negatively acknowledge SN=0. The transmitter will retransmit the PDU of SN=0 with polling bit set. If the retransmitted PDU is received successfully, the receiver will positively acknowledge SN=0. In such a situation, the transmitter need to poll again with a POLL SUFI, to retransmits other PDUs. Thus, retransmission of SN=3 will be delayed for quite a long period of time. In other words, using the POLL SUFI to poll the receiving, the prior art method can prevent retransmission of transmitted PDU, but may cause transmission delay and degradation of efficiency.

SUMMARY OF THE INVENTION

According to the claimed invention, a method for polling transmission status in a transmitter of a wireless communications system comprises forming a status protocol data unit comprising a poll sequence number field indicating a sequence number of a protocol data unit to be polled when a polling procedure is triggered to poll a receiver, setting a value of the poll sequence number field to be a sequence number of a next protocol data unit to be transmitted for the first time minus 1, and transmitting the status protocol data unit to the receiver.

According to the claimed invention, a communications device for accurately polling transmission status in a wireless communications system comprises a control circuit for realizing functions of the communications device, a processor installed in the control circuit, for executing a program code to command the control circuit, and a memory installed in the control circuit and coupled to the processor for storing the program code. The program code comprises forming a status protocol data unit comprising a poll sequence number field indicating a sequence number of a protocol data unit to be polled when a polling procedure is triggered to poll a receiver, setting a value of the poll sequence number field to be a sequence number of a next protocol data unit to be transmitted for the first time minus 1, and transmitting the status protocol data unit to the receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
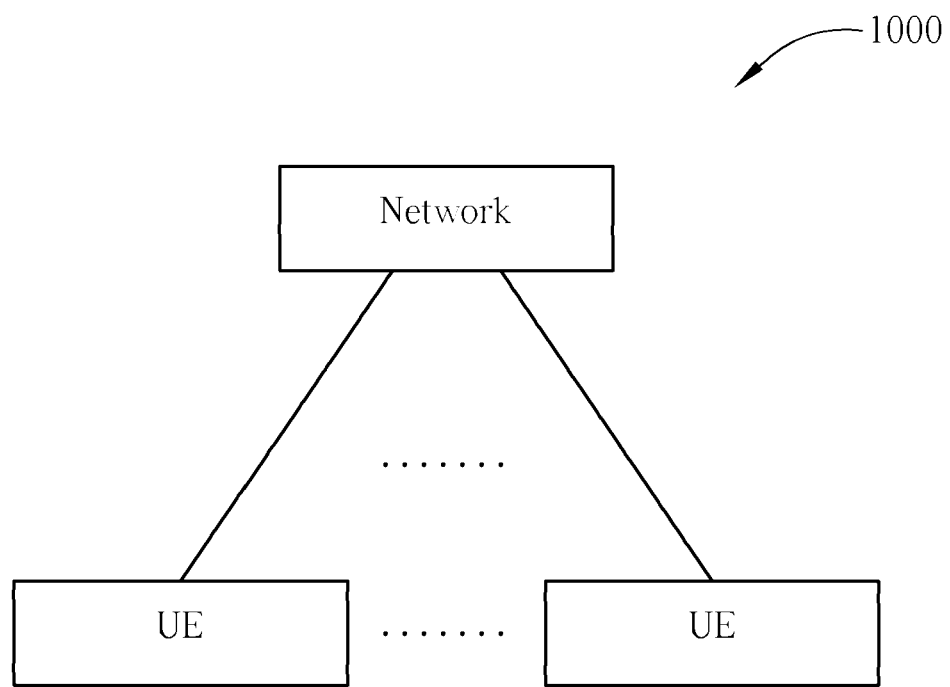
FIG. 1 is a schematic diagram of a wireless communications system.

Please refer to FIG. 1, which illustrates a schematic diagram of a wireless communications system 1000. The wireless communications system 1000 can be a 3G mobile telecommunications system, an LTE (long-term evolution) system or other mobile communications systems, and is briefly composed of a network and a plurality of UEs. In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
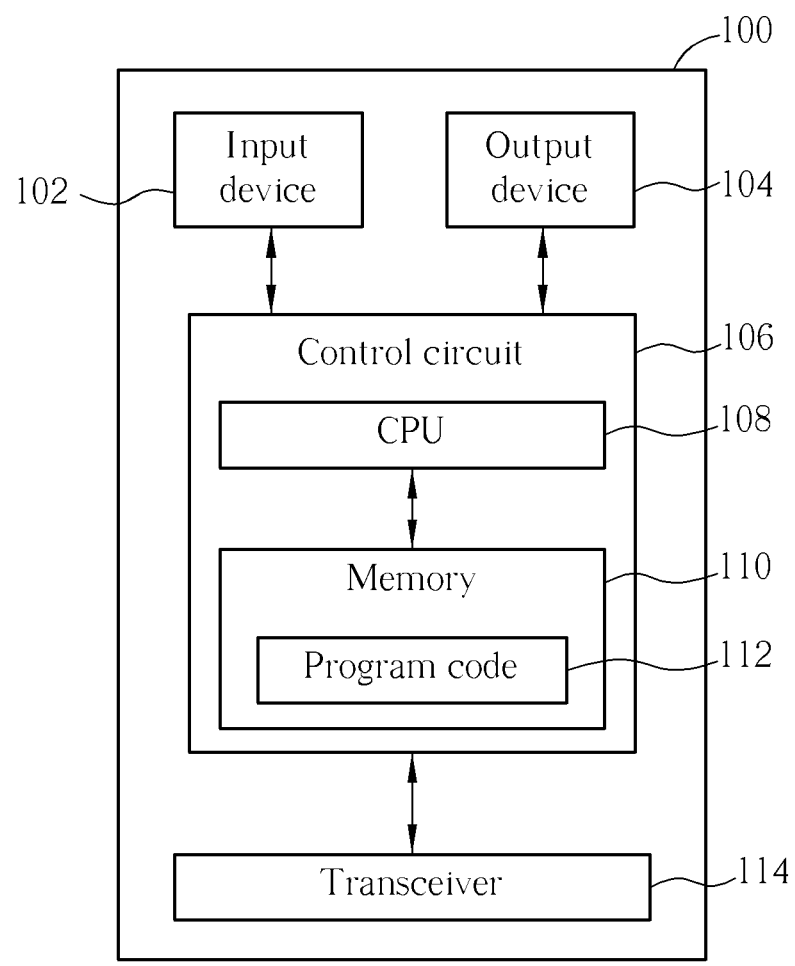
FIG. 2 is a function block diagram of a wireless communications device.

Please refer to FIG. 2, which is a functional block diagram of a communications device 100. The communications device 100 is utilized for realizing the network or the UEs. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
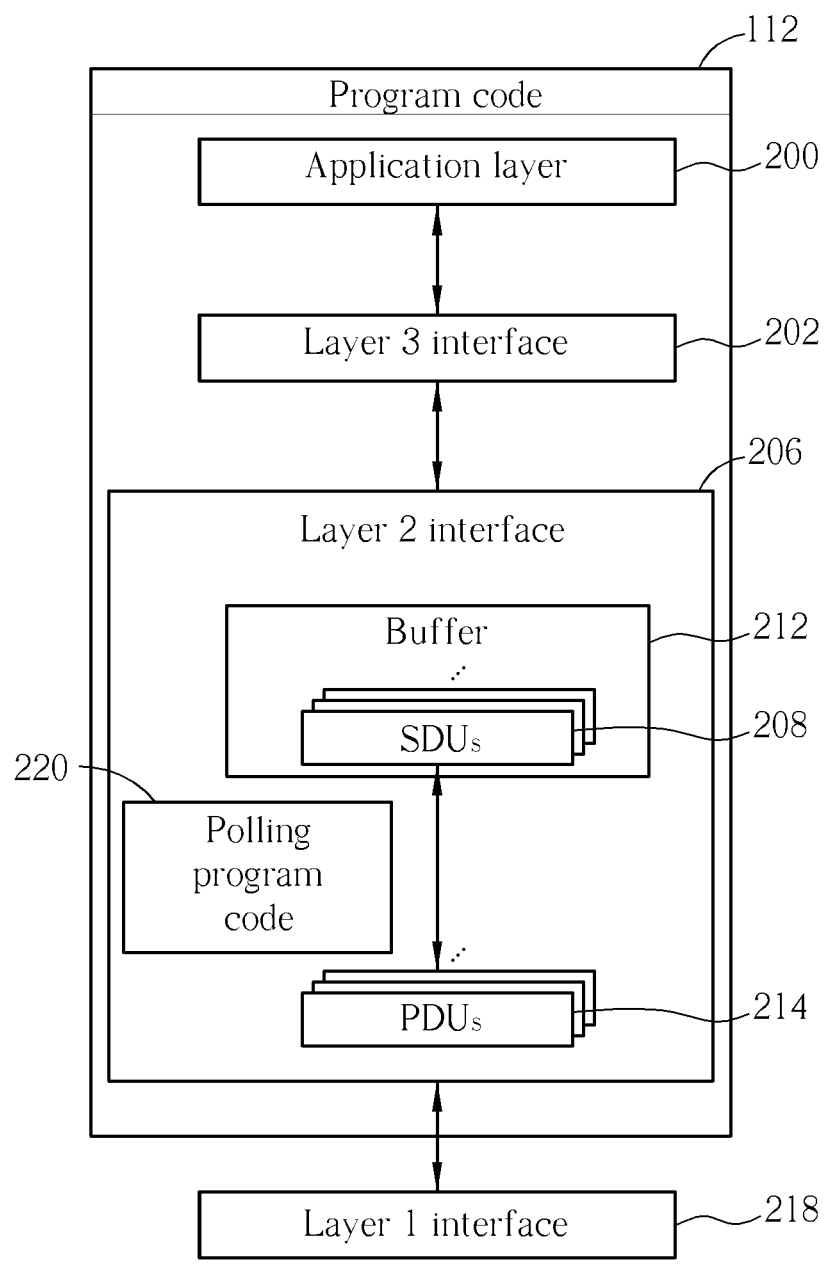
FIG. 3 is a diagram of program code of FIG. 2.

Please continue to refer to FIG. 3. FIG. 3 is a diagram of the program code 112 shown in FIG. 2. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, for better data accuracy and robustness, the Layer 2 interface 206 (RLC layer) can initiate a status report procedure at an appropriate time to poll a receiver and request a status report, or a piggybacked status report. In such a situation, the embodiment of the present invention provides a polling program code 220 for accurately polling transmission status.

Figure 4:
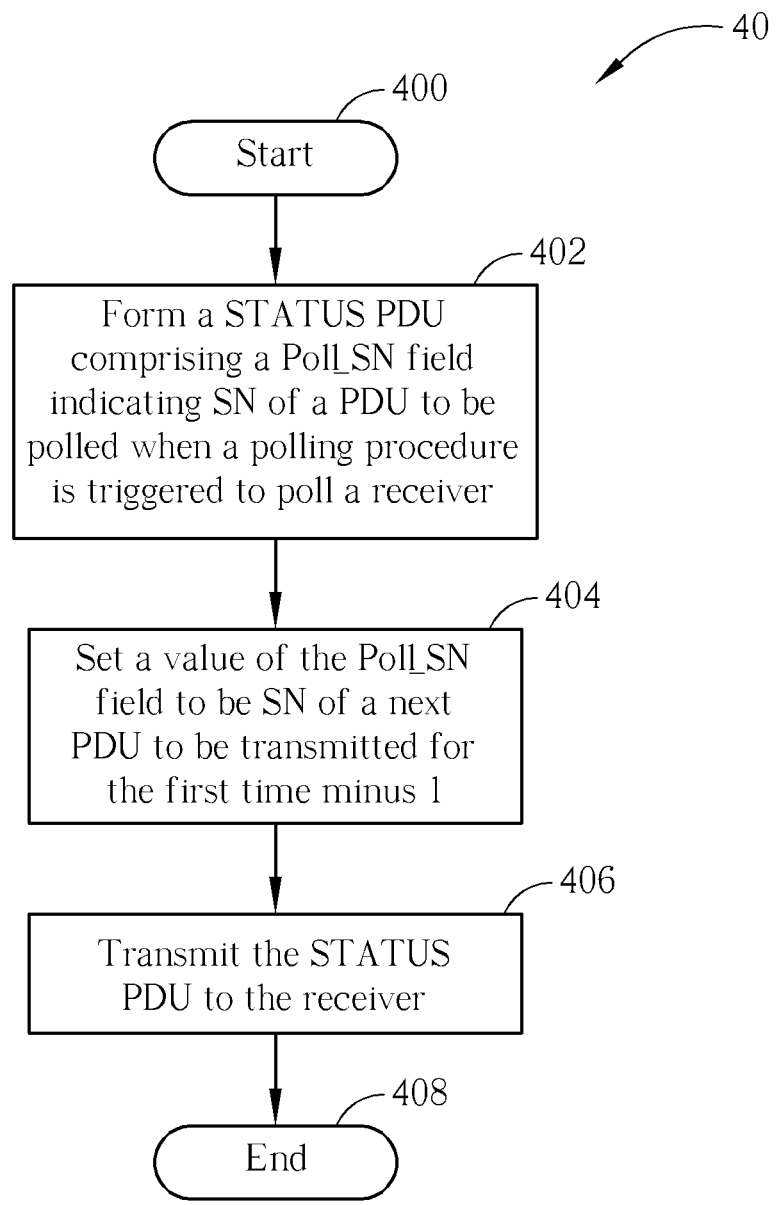
FIG. 4 is a flowchart of a process according to an embodiment of the present invention.

Please refer to FIG. 4, which illustrates a schematic diagram of a process 40 according to an embodiment of the present invention. The process 40 is utilized for polling transmission status in a transmitter of the wireless communications system 1000. The transmitter can be the network or UE. The process 40 can be compiled into the polling program code 220, and comprises the following steps:

Step 400: Start.

Step 402: Form a STATUS PDU comprising a Poll_SN field indicating SN of a PDU to be polled when a polling procedure is triggered to poll a receiver.

Step 404: Set a value of the Poll_SN field to be SN of a next PDU to be transmitted for the first time minus 1.

Step 406: Transmit the STATUS PDU to the receiver.

Step 408: End.

According to the process 40, when a polling procedure is triggered, the embodiment of the present invention forms a STATUS PDU containing a Poll_SN field, to indicate SN of a PDU to be polled. Meanwhile, the embodiment of the present invention sets the value of the Poll_SN field to be SN of a next PDU to be transmitted for the first time minus 1, namely VT(S)−1, and sends the STATUS PDU to the receiver. Preferably, the size of the transmission window, namely the protocol parameter "Configured_Tx_Window_Size" is smaller than 2048.

In short, when a poll is triggered, the embodiment of the present invention sets the value of the Poll_SN field to VT(S)−1. In other words, whether the "Configured_Tx_Window_Size" is less than 2048 or not, the embodiment of the present invention always sets Poll_SN to VT(S)−1, so as to prevent delay of retransmission. For example, in the transmitter, suppose that the "Configured_Tx_Window_Size" is configured to be 1024, and PDUs of SN=0, 1, 2, 3 have been transmitted. In other words, VT(S)=4. Suppose that none of the four transmitted PDUs are positively acknowledged. When a poll is triggered, by the embodiment of the invention, the transmitter sends a POLL SUFI with Poll_SN set to 3. Suppose the receiver did not receive any of the four PDUs before receiving the POLL SUFI. Since the receiver considers SN=3 has been transmitted, the receiver will send a status report to negatively acknowledge SN=0~3. The transmitter will retransmit the PDUs of SN=0~3 with polling bit set in the PDU of SN=3. Thus, transmission latency is minimized. Therefore, when the transmitter triggers to poll the receiver, the embodiment of the present invention can not only prevent retransmission of PDUs that have been successfully transmitted, but also reduce transmission latency.

In summary, when the transmitter triggers to poll the receiver, the embodiment of the present invention always sets Poll_SN to VT(S)−1, to prevent transmission delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for polling transmission status in a transmitter of a wireless communications system comprising:
    forming a Poll Super Field (POLL SUFI) status protocol data unit comprising a poll sequence number field indicating a sequence number of a protocol data unit to be polled when a polling procedure is triggered to poll a receiver;
    always setting a value of the poll sequence number field to be a sequence number of a next protocol data unit to be transmitted for the first time minus 1 regardless of whether Configured_Tx_Window_Size is less than, greater than, or equals to 2048, in order to reduce transmission latency; and
    transmitting the status protocol data unit to the receiver.

2. The method of claim 1, wherein a size of a transmission window of the transmitter is smaller than 2048.

3. The method of claim 1, wherein the transmitter and the receiver operate in an acknowledged mode.

4. A communications device for accurately polling transmission status in a wireless communications system comprising:
    a control circuit for realizing functions of the communications device;
    a processor installed in the control circuit, for executing a program code to command the control circuit; and
    a memory installed in the control circuit and coupled to the processor for storing the program code;
    wherein the program code comprises:
        forming a Poll Super Field (POLL SUFI) status protocol data unit comprising a poll sequence number field indicating a sequence number of a protocol data unit to be polled when a polling procedure is triggered to poll a receiver;
        always setting a value of the poll sequence number field to be a sequence number of a next protocol data unit to be transmitted for the first time minus 1 regardless of whether Configured_Tx_Window_Size is less than, greater than, or equals to 2048, in order to reduce transmission latency; and
        transmitting the status protocol data unit to the receiver.

5. The communications device of claim 4, wherein a size of a transmission window of the transmitter is smaller than 2048.

6. The communications device of claim 4, wherein the communications device operates in an acknowledged mode.

* * * * *